United States Patent [19]
Westra et al.

[11] Patent Number: 4,655,247
[45] Date of Patent: Apr. 7, 1987

[54] BALL-TYPE CHECK VALVE ASSEMBLY

[75] Inventors: Lubbert Westra; Brent J. Lirette, both of Houma, La.

[73] Assignee: Chromalloy American Corporation, St. Louis, Mo.

[21] Appl. No.: 820,544

[22] Filed: Jan. 17, 1986

[51] Int. Cl.⁴ .............................................. F16K 15/04
[52] U.S. Cl. .................................. 137/519.5; 251/368
[58] Field of Search ........... 137/519.5, 533.11, 533.13, 137/533.15

[56] References Cited

U.S. PATENT DOCUMENTS 1,882,314 10/1932 Burt .............................. 137/519.5 X
3,279,545 10/1966 Page ............................ 137/533.11 X

FOREIGN PATENT DOCUMENTS 773742 11/1934 France ............................ 137/533.15
1275628 10/1961 France ............................ 137/533.15
2102474 2/1983 United Kingdom ............. 137/519.5

Primary Examiner—Robert G. Nilson
Attorney, Agent, or Firm—Haverstock, Garrett and Roberts

[57] ABSTRACT

A ball-type check valve assembly for use in a fluid flow line includes a valve body having an inlet end and an outlet end, a ball retainer cup positioned within the valve body intermediate the inlet and the outlet end, the ball retainer cup having a passageway extending therethrough adapted to fluidly communicate the inlet passageway with the outlet passageway, spaced apart lug members attached to the valve body adapted to support said ball retainer cup, a plurality of fluid channels defined by the space between adjacent ones of the lug members to fluidly communicate the inlet passageway with the outlet passageway and being adapted to direct the flow of fluid received from the inlet passageway to a first location within the outlet passageway, a flexible skirt member having one end portion thereof abutting the ball retainer cup and extending therefrom to another end portion located at a second location within the outlet passageway between the first location and the outlet end, the flexible skirt member having a passageway extending therethrough which registers with the passageway extending through the ball retainer cup and adapted to permit fluid to flow from the channels into and through the outlet passageway, and a ball valve member adapted to be moved between the ball retainer cup and the inlet end.

7 Claims, 3 Drawing Figures

4,655,247

BALL-TYPE CHECK VALVE ASSEMBLY

BACKGROUND OF THE INVENTION

1. Field of the Invention

The present invention relates to a ball-type check valve assembly adapted to be incorporated in strings of pipe, tubing and conduit to control the passage of fluids therethrough and, more particularly, relates to a ball-type check valve assembly particularly adapted to be incorporated in float shoes or float collars to control the passage of cement therethrough.

2. Prior Art

It is conventional practice in the oil and gas industry to cement casing in well bores in order to secure and support the casing in the well bore and to isolate various formations from one another by preventing migration of formation fluids up and down the well bore. Float equipment, such as float shoes and float collars, are typically utilized for this purpose. Such float equipment places the cement in the annulus between the casing and the well bore wall by conducting cement down the casing and out through the bottom thereof where it flows upwardly through the annular space between the casing and the bore hole wall to the desired level. During placement of the cement, it must pass through the equipment freely, but upon completion of the cementing process, the equipment must positively prevent backflow of the cement into the casing. The consequences of such float equipment not preventing backflow are always detrimental and costly. For example, leaking floating equipment allows the cement to set up inside the casing which thereby causes the need to drill it out. Even more serious consequences may result from lowering the cement level in the annulus, thus possibly exposing formations which are intended to be sealed off. Remedial work is very costly in direct expenses and consequential costs such as delay in completion or total loss of a well. The only way to prevent backflow through otherwise leaking float equipment is to hold pressure on the casing which in turn affects the quality of the cementing operation because when the cement has cured and the pressure on the casing is released, a leakage path results between the casing and the cement. Accordingly, it is necessary to provide a valve which will resist the back pressure of the cement slurry in the annulus upon completion of the cementing operation, and which is capable of withstanding the abrasive action of fluid passing through it at high flow rates and for long duration.

Although it has been proposed to use flapper valves and plunger valves in performing the above-identified functions, it has been found that such types of valves are subject to considerable wear because of the movable parts therein and are therefore not reliable for extended periods of use such as in deep wells where large quantities of cement are used and where large volumes of drilling fluid are circulated prior to cementing. For example, in the typical flapper valve assembly there is a flapper which is hinge suspended and spring operated. With high and extended flow-rates, the flappers become very unsteady thereby causing excessive wear to the flapper plate, the hinge mechanism and the spring and such excessive wear renders the flapper valve ineffective for preventing backflow. Likewise, the typical plunger valve assembly utilizes a spring mechanism which is susceptible to excessive wear caused by repeated movement of the plunger and plunger stem thereagainst. In addition, the wear on the plunger stem leads to misalignment of the plunger with the plunger seat which allows leakage of cement therethrough. Thus, plunger valves are also not reliable for use in deep wells. Due to the inadequacies of flapper valve assemblies and plunger valve assemblies, it has been determined that a ball-type check valve assembly is more suitable for preventing backflow of the cement.

Various ball-type check valve assemblies have been designed and manufactured for controlling the passage of fluids through pipes, conduits, tubings and the like. Examples of such ball-type float valve assemblies are disclosed in Harrison et al U.S. Pat. No. 4,529,167; Garneau U.S. Pat. No. 4,527,594; Vadasz U.S. Pat. No. 4,513,778; Sigworth, Jr. U.S. Pat. No. 4,314,667; Ninomiya et al U.S. Pat. No. 4,286,622; Clark, Jr. U.S. Pat. No. 3,096,825; Ecker U.S. Pat. No. 2,682,281; and Hudson U.S. Pat. No. 2,155,550.

A common characteristic of ordinary ball-type check valve assemblies is that the ball valve member is easily unseated from the ball valve member retainer and, as fluid continues to flow through the valve assembly, the ball valve member is subject to a considerable amount of random movement, hammering and peening. Such random movement, hammering and peening of the ball valve member inflicts appreciable damage to the check valve cage and to the ball valve seats, as well as to the ball valve member itself, such damage thereby rendering the apparatus ineffective for controlling the passage of fluids therethrough.

Prior art ball-type check valve assemblies have proved to be unsatisfactory for positively supporting and stabilizing the ball valve member to reduce or eliminate such random movement, hammering and peening of the ball valve member.

SUMMARY OF THE INVENTION

The present invention overcomes the disadvantages and shortcomings of the known ball-type check valve assemblies by providing a ball-type check valve assembly with means for positively retaining the ball valve member, the ball-type check valve assembly of the present invention being particularly adapted to be utilized in float equipment used to cement casing in well bores.

The present invention resides in providing a ball-type check valve assembly with an elongated tubular member having one end thereof abutting a cone-shaped ball retainer cup or ball seat. The ball retainer cup is positioned within a check valve body intermediate an inlet end and an outlet end of the check valve body, such ball retainer cup having a generally cone-shaped seating area and having a passageway extending therethrough. Channels are provided within the check valve body for directing the flow of fluid from an inlet passageway to an outlet passageway when the ball valve member is seated upon the ball retainer cup, such channels being adapted to direct the flow of fluid into the outlet passageway at a first location spaced from the outlet end. The elongated tubular member has one end thereof abutting the ball retainer cup and extends from the ball retainer cup through the outlet passageway and terminates at another end portion located at a second location between the outlet end of the check valve body and the first location. The elongated tubular member has a passageway extending therethrough which registers with the passageway extending through the ball retainer cup and has an outside diameter which is adapted to be less than the inside diameter of the outlet passageway.

When fluid from the flow line enters through the inlet end, it is directed through the inlet passageway, the initial flow of fluid therethrough directing and forcing the ball valve member to seat upon the cone-shaped seating area of the ball retainer cup. The fluid is distributed in the cone-shaped seating area around the ball in such a way that a semi-stagnant fluid cone exists above the ball valve member thereby directing the flow of fluid around the ball valve member. The fluid then flows around an upper portion of the ball retainer cup, into and through the channels, around the remaining portion of the ball retainer cup, into and through the outlet passageway, and to and through the outlet end and into the flow line. The fluid flows past the other end portion of the elongated tubular member as it flows through the outlet passageway and into the outlet end, whereby a reduction in pressure occurs within the passageway extending through the elongated tubular member. This reduction in pressure causes the ball valve member to be drawn against the cone-shaped seating area of the ball retainer cup. Therefore, due to the reduction in pressure within the passageway of the elongated tubular member, the ball valve member is positively seated upon the cone-shaped seating area of the ball retainer cup until the fluid flow is stopped.

When the direction of the fluid flow is reversed, the fluid from the flow line flows through the outlet end and is directed through the passageway extending through the elongated tubular member, through the passageway extending through the ball retainer cup and against an underside portion of the ball valve member. The flow of fluid from this direction forces the ball valve member to a ball valve seat member which is positioned in the inlet passageway adjacent the inlet end of the check valve body whereby the ball valve member is positively seated upon such ball valve seat member thereby closing the check valve assembly and preventing further flow of fluid in the reverse direction.

The elongated tubular member can be of any desired shape or construction depending on the particular use of the check valve assembly. For example, a flexible skirt can be utilized in check valve assemblies adapted to be utilized in operations wherein a relatively small volume of fluid will pass therethrough. In check valve assemblies adapted to be utilized in operations wherein relatively large volumes of fluid are passed therethrough, an elongated tubular member of a more rigid construction is desirable. For example, a tubular member of rigid construction can be constructed of plastic, metal or other rigid material adapted to withstand the force exerted thereon by the fluid entering the outlet passageway by way of the channels without collapsing.

Accordingly, it is a principal object of the present invention to provide a ball-type check valve assembly with means adapted to positively seat the ball valve member thereby reducing or preventing random movement, hammering and peening of the ball valve member.

A further object of the present invention is to provide a ball-type check valve assembly wherein the damage inflicted upon the ball valve member, the check valve cage and the ball valve seats, is significantly reduced or eliminated thereby reducing leakage and thereby improving the effectiveness and reliability of the check valve assembly.

DESCRIPTION OF A PREFERRED EMBODIMENT

Figure 1:
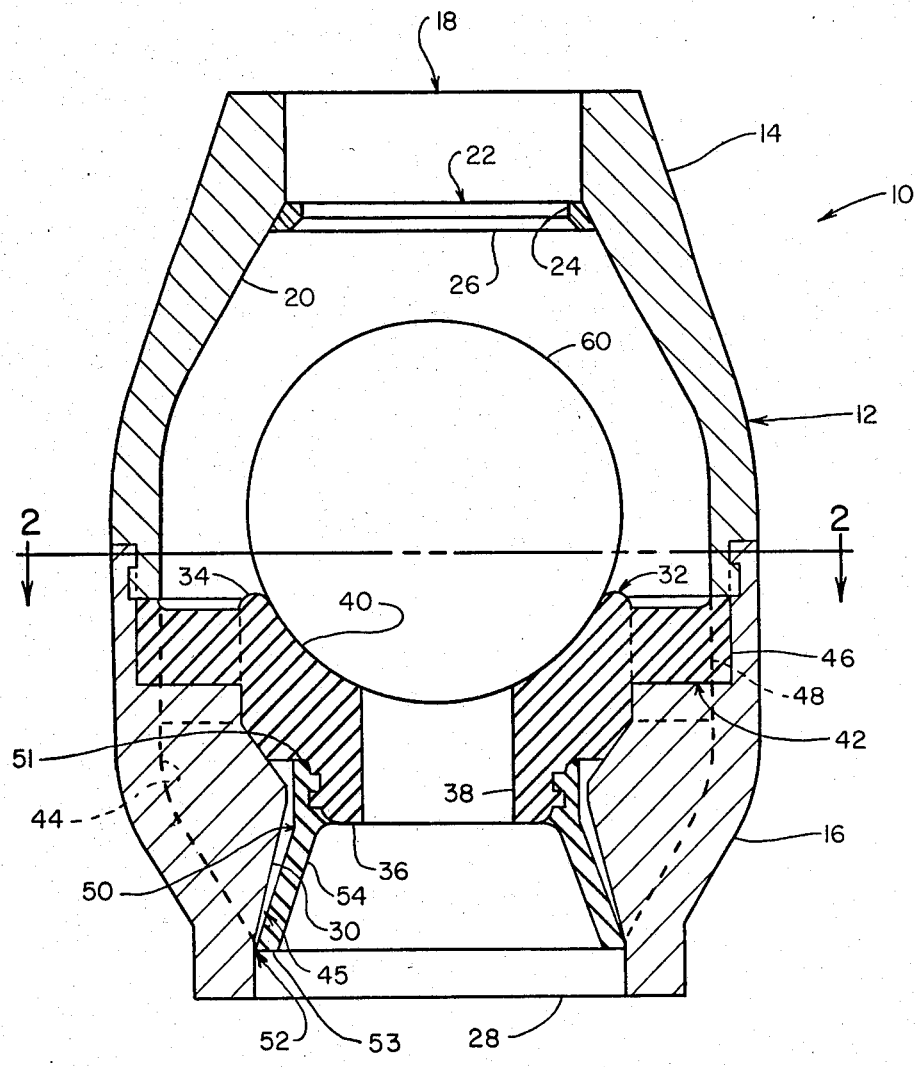
FIG. 1 is a longitudinal cross-section view of the ball-type check valve assembly in accordance with the present invention showing the elongated tubular member as a flexible skirt and showing the lower section thereof as a cross-section taken along lines 1—1 of FIG. 2.
Figure 2:
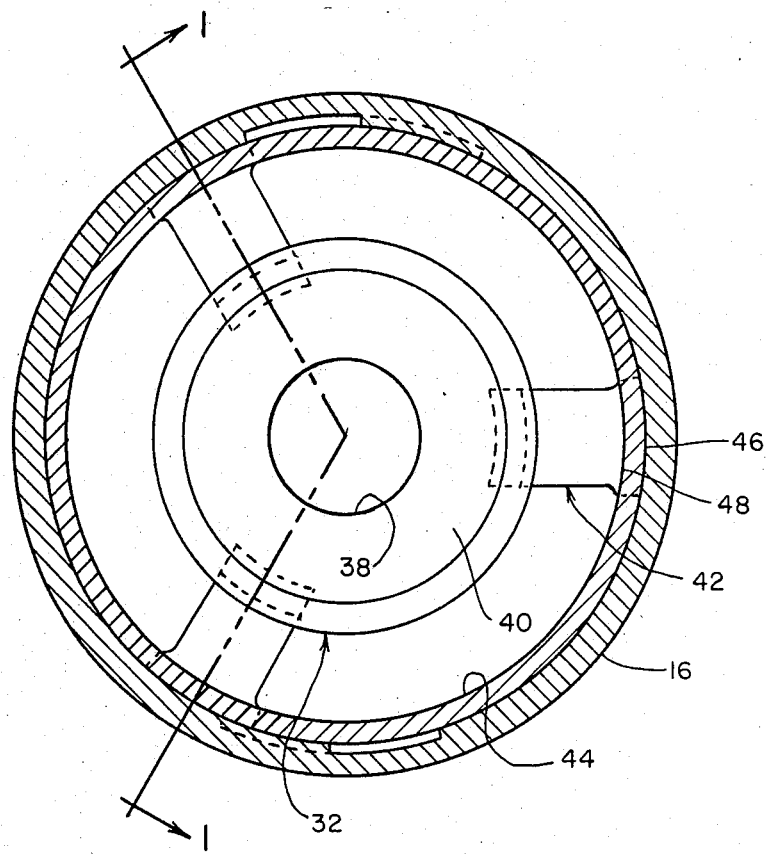
FIG. 2 is a sectional view taken along lines 2—2 of FIG. 1.

Referring to the drawings more particularly by reference numbers, wherein like numbers refer to like parts, the ball-type check valve 10 of FIG. 1 is a preferred embodiment constructed according to the teachings of the present invention and includes a valve body 12 which has an upper portion 14 and a lower portion 16. The upper portion 14 and the lower portion 16 are preferably connected by way of a twist-lock mechanism, but, other means, such as male and female threaded members, may be utilized.

The upper portion 14 has an inlet end 18 for directing the flow of fluid from a fluid flow line (not shown) to and through an inlet passageway 20. It is preferable, as shown in FIG. 1, that the inlet passageway 20 extends radially angularly from the inlet end 18 to facilitate the passage of fluid therethrough with minimal disturbance of a ball valve member which is located therein. Preferably, the upper portion 14 includes an upper ball seat 22 positioned adjacent the inlet end 18 between the inlet end 18 and the inlet passageway 20. The upper ball seat 22 has an aperature 24 therein so that the inlet end 18 remains in fluid communication with the inlet passageway 20. The upper ball seat 22 is constructed such that the surface 26 thereof extends radially outwardly and angularly from the aperature 24 so as to provide a surface adapted to sealingly cooperate with a ball valve member. The lower portion 16 includes an outlet end 28 for directing the flow of fluid received from an outlet passageway 30 into the fluid flow line, the outlet passageway 30 being adapted to fluidly communicate with the inlet passageway 20.

A ball retainer cup 32 having a first end portion 34 and a second end portion 36 is positioned within the valve body 12 intermediate the inlet end 18 and the outlet end 28. The optimal position of the ball retainer cup 32 will depend on the size of the ball valve member utilized since, to reduce turbulence within the valve assembly to a minimum, it is preferable to locate the center of the ball valve member when it is positioned upon the ball retainer cup 32 at the widest area of the inlet passageway 20. The ball retainer cup 32 includes a passageway 38 extending therethrough so that fluid communication can be established between the inlet passageway 20 and the outlet passageway 30. The upper surface 40 of the ball retainer cup 32 extends radially outwardly and upwardly from the passageway 38 thereby providing a surface 40 which is generally cone-shaped to facilitate sealing cooperation over a wide area of a ball valve member. Due to the shape of the surface 40, such surface 40 is not subjected to abrasive action of fluids passing thereover and, more importantly, facilitates the ball valve member seating over a wide area.

In the preferred embodiment, the ball retainer cup is held in place within the check valve body 12 by spaced apart lug members 42. The lug members 42 are spaced around and attached to the valve body 12 with the space between adjacent ones of the lug members 42 defining channels 44 which direct the flow of the fluid from the inlet passageway 20 and into the outlet passageway 30, such fluid entering the outlet passageway 30 at a first location 45 spaced from the outlet end 28. The lug members 42 have end portions 46 which extend into slots 48 cut into the valve body 12 thereby providing means for supporting the lug members 42 to prevent them and the ball retainer cup 32 from being moved by the force exerted thereon by the flowing fluid. It will be readily recognized by one skilled in the art that such lug members may be attached in a variety of ways such as by welding and gluing, and that the ball retainer cup 32 may be held in place by other means so long as such other means includes one or more channels adapted to fluidly communicate the inlet passageway 20 with the outlet passageway 30.

A flexible skirt 50 has an end portion 51 which abuts the ball retainer cup 32 and, preferably, is attached to the ball retainer cup 32 at a position adjacent the passageway 38. The flexible skirt 50 extends from the second end 36 of the ball retainer cup 32 through the outlet passageway 30 and terminates at another end portion 53 which is located at a second location 52 within the outlet passageway 30 between the first location 45 and the outlet end 28. The flexible skirt 50 is constructed so as to abut the outlet passageway 30 at the second location 52 thereof so that fluid flow which enters through the outlet end 28 will not be directed into the channels 44, but, will be directed only through a passageway 54 extending through the flexible skirt 50. The passageway 54 is in fluid communication with the passageway 38 extending through the ball retainer cup 32.

A ball valve member 60 is disposed within the valve body 12 and is movable between an open position and a closed position. In the open position, the ball valve member 60 rests upon the ball retainer cup 32 and seals off the passageway 38 so that all fluid communication between the inlet passageway 20 and the outlet passageway 30 by way of the passageway 38 is eliminated thereby directing the fluid flow into the channels 44. In the closed position, the ball valve member 60 rests upon the ball seat 22 thereby preventing flow of fluid in the reverse direction.

When fluid flows from the flow line and enters through the inlet end 18, the fluid is directed into and through the inlet passageway 20, the initial force of the fluid forcing the ball valve member 60 against the ball retainer cup 32. The fluid will then be directed around the ball valve member 60, the generally conical shape of the inlet passageway 20 facilitating a semi-stagnant fluid cone above the ball valve member 60. The fluid then flows around an upper portion of the ball retainer cup 32, into the channels 44, around the remaining portion of the ball retainer cup 32 and against the flexible skirt 50. As the fluid flows against the flexible skirt 50, the skirt 50 flexes inwardly to allow the fluid to flow from the channels 44, into the outlet passageway 30, to and through the outlet end 28 and into the fluid flow line. Due to the fact that the skirt 50 flexes inwardly and also due to the fact that the flow of fluid is directed past the end portion 53 of the flexible skirt 50, a vacuum effect occurs which results in a reduction in pressure within the passageway 54 of the flexible skirt 50 thereby drawing the ball valve member 60 against the cone-shaped surface 40 of the ball retainer cup 32 and positively seating it thereupon until the fluid flow is stopped.

When the fluid flows in the reverse direction, the flow is directed from the flow line, through the outlet end 28 and into the passageway 54 which extends through the flexible skirt 50. Since the flexible skirt 50 abuts the outlet passageway 30 at the second location 52, and since the channels 44 direct fluid into the passageway 30 at the first location 45 which is spaced from the second location 52, the flow of fluid cannot be directed into the outlet passageway 30 and therefore cannot be directed into the channels 44. The fluid then flows through the passageway 54, into and through the passageway 38 which extends through the ball retainer cup 32, and to the underside portion of the ball valve member 60, whereby the ball valve member 60 is moved from an open position wherein the ball valve member 60 sealingly engages the surface 40 of the ball retainer cup 32 to a closed position wherein the ball valve member 60 sealingly engages the surface 26 of the upper ball seat 22 thereby closing off the check valve 10 and preventing further flow of the fluid in the reverse direction. Thus, when the flow of fluid is in the reverse direction, alternate directions in which the fluid can flow through the check valve assembly 10 are eliminated and, therefore, the number of directions from which the ball valve member is acted upon by the fluid is reduced to a single direction.

Figure 3:
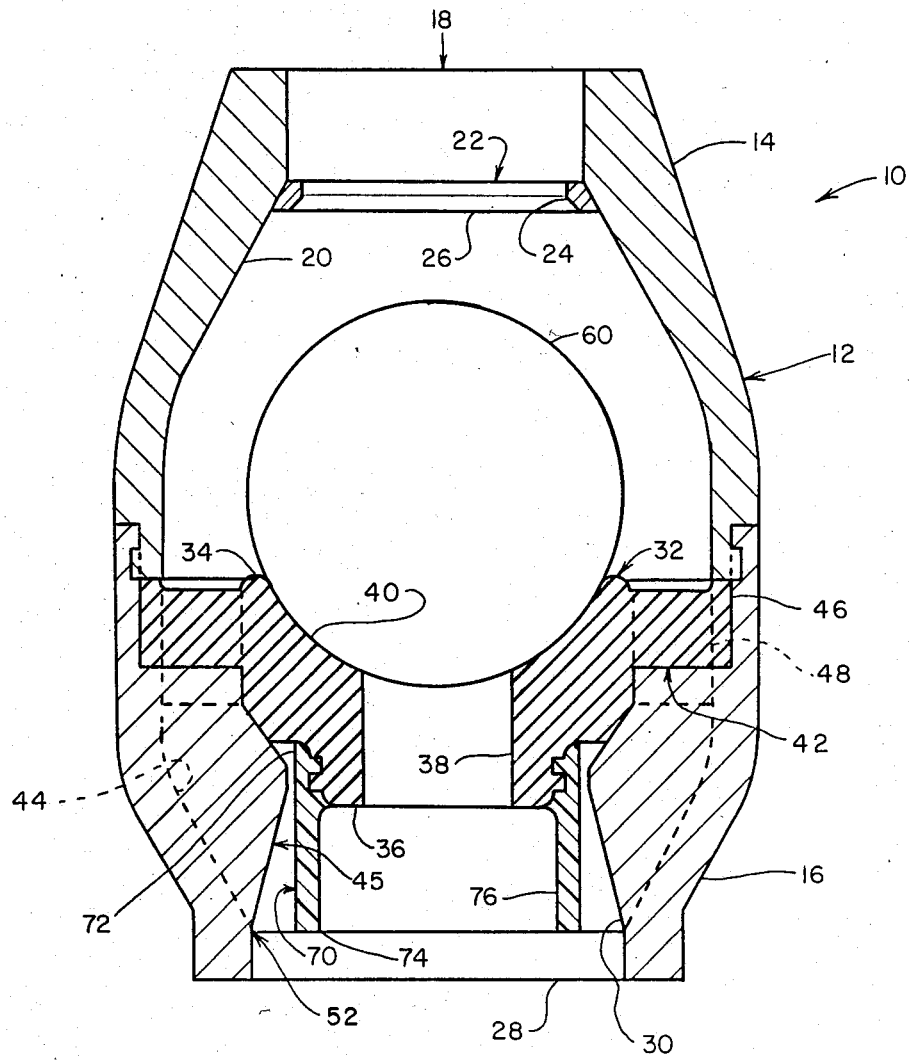
FIG. 3 is a longitudinal cross-section view of the ball-type check valve assembly of the present invention showing the elongated tubular member as a rigid tubular member.

FIG. 3 shows an alternate embodiment of the ball-type check valve 10 of the present invention wherein the flexible skirt 50 is replaced with an elongated tubular member 70 of sufficiently rigid construction to prevent the member 70 from collapsing when relatively large volumes of fluid are passed through the check valve assembly 10. The rigid tubular member 70 has one end portion 72 which abuts the ball retainer cup 32, and preferably is attached thereto, and another end portion 74 which extends into the outlet passageway 30 to the second location 52. The rigid tubular member 70 includes a passageway 76 which is in fluid communication with the passageway 38 of the ball retainer cup 32 and is constructed to have an outside diameter which is less than the diameter of the outlet passageway 30 to permit fluid entering the outlet passageway 30 by way of the channels 44 to flow therearound and to and through the outlet end 28. In this embodiment, a reduction in pressure occurs within the passageway 76 of the rigid tubular member 70 when the fluid flowing through the outlet passageway 30 flows past the other end portion 74 of the tubular member 70. The reduction in pressure within the passageway 76 draws the ball valve member 60 against the cone-shaped surface 40 of the ball retainer cup 32 to positively seat it thereupon until the fluid flow is stopped. When fluid flows in the reverse direction, the flow is directed from the flow line, through the outlet end 28, into the outlet passageway 30 and into the passageway 76 of the rigid tubular member 70. A small volume of fluid may be directed around the rigid tubular member 70 and into the channels 44. However, since the rigid member 70 extends to a location between the outlet end 28 and the channels 44, namely, to the second location 52, a major portion of the fluid flowing in the reverse direction will be directed through the passageway 76, into and through the passageway 38 which extends through the ball retainer cup 32, and to the underside portion of the ball valve member 60, whereby the ball valve member 60 is moved from an open to a closed position as previously discussed and described.

The preferred materials of construction of the valve body 12, the lug members 42, the ball retainer cup 32 and the upper ball seat 22 are well known high abrasion resistant and high temperature resistant thermoset plastics, particularly those comprised of the thermosetting phenolic resins. Other plastic materials include reinforced nylons, polycarbonates, rigid acrylonitrile-butadiene-styrene copolymers and other rigid plastics. Also, ceramic materials are useful in this invention. Other materials may also be used depending on the particular use or application of the check valve assembly. For example, suitable well known valve assembly metals such as aluminum, iron, steel, brass, copper and other metals used in customary valve constructions may be used in this invention.

The preferred materials of construction of the rigid elongated tubular member 70 are the well known high abrasion resistant and high temperature resistant thermoset plastics, particularly those comprised of thermosetting phenolic resins. Other plastic materials as well as metals similar to those used in constructing the valve body 12, the lug members 42, the ball retainer cup 32 and the upper ball seat 22 can also be used in constructing the elongated tubular member 70.

The preferred materials of construction of the flexible skirt 50 are ethylene-oropylene-diene monomer rubber (EPDM) particular use or appllication of the ball-type check valve assembly. Examples are nylons, rubber compounds, compounds of butadiene-acrylonitrile copolymers, vinyl chloride-vinylidene chloride copolymers, vinyl chloride-styrene copolymers, polytetrafluoro-ethylene polymers and other polymeric materials.

The ball valve member 60 can be constructed of a variety of well known materials typically utilized for ball valve members such as aluminum, and other frangible metals. Also, it may be made from one of the rigid plastics listed herein. It is preferred, however, that the ball valve member 60 be constructed of fabric reinforced phenolic compounds. Also, the ball valve member 60 may be coated with a suitable rubber compound to reduce wear on the ball valve member 60, the ball retainer cup 32, the upper ball seat 22 and the inlet passageway 20 and to allow the ball valve member to effectively sealingly cooperate with the ball retainer cup 32 and the upper ball seat 22.

A ball-type check valve assembly particularly adapted to be used in float equipment used to cement casing in well bores can be constructed utilizing the aforementioned preferred materials. The check valve assembly constructed in this manner effectively prevents backflow of the cement slurry, positively retains the ball valve member and such assembly can be easily drilled out with the drill bit once the cementing operation is complete in order to proceed with drilling the well.

Thus, there has been shown and described a novel ball-type float valve assembly which fulfills all of the objectives and advantages sought therefor and which is particularly adapted to be utilized in float equipment used in the process of cementing casing in well bores. It will be apparent to those skilled in the art, however, that many changes, variations and modifications of the subject ball-type check valve assembly are possible and are contemplated, and all such changes, variations and modifications which do not depart from the spirit and scope of the present invention are deemed to be covered by the invention which is limited only by the claims which follow. It will also be apparent to those skilled in the art that other uses and applications, such as for controlling the flow of fluids through pipe, tubing and conduit, are possible and are contemplated, and all such other uses and applications which do not depart from the spirit and scope of the present invention are likewise deemed to be covered by the invention which is limited only by the claims which follow.

What is claimed is:

1. A ball-type check valve assembly for use in a fluid flow line comprising a valve body including an inlet end for directing the flow of fluid from the fluid flow line into an inlet passageway, an outlet end for directing the flow of fluid received from an outlet passageway into the fluid flow line, said outlet passageway being adapted to fluidly communicate with said inlet passageway, a ball retainer cup positioned within the valve body intermediate said inlet end and said outlet end, said ball retainer cup having a passageway extending therethrough providing first means adapted to fluidly communicate said inlet passageway with said outlet passageway, support means adapted to support said ball retainer cup in the position intermediate said inlet end and said outlet end, at least one channel providing second means adapted to fluidly communicate said inlet passageway with said outlet passageway, said channel being adapted to direct the flow of fluid received from said inlet passageway into said outlet passageway at a first location therein spaced from said outlet end, a flexible skirt member having one end portion abutting said ball retainer cup and extending therefrom to another end portion located at a second location within said outlet passageway between said first location and said outlet end, said flexible skirt member having a passageway extending therethrough which is in fluid communication with the passageway extending through said ball retainer cup and having an outside diameter adapted to allow fluid flowing from said channel to flow into and through said outlet passageway, and a ball valve member adapted to be moved between said ball retainer cup and said inlet end.

2. The ball-type check valve assembly of claim 1 including a ball seat positioned adjacent said inlet end in the inlet passageway, said ball seat having an aperture therein to allow fluid received from said inlet end to flow therethrough and into said inlet passageway.

3. An assembly according to claim 1 or claim 2 wherein said support means includes a plurality of spaced apart lug members, each of said lug members having one end attached to said valve body and another end attached to a portion of said ball retainer cup, the space between adjacent ones of said lug members defining channels providing said second means adapted to fluidly communicate said inlet passageway with said outlet passageway, each of said channels being adapted to direct the flow of fluid received from said inlet passageway into said outlet passageway at a first location spaced from said outlet end.

4. The ball-type check valve assembly of claim 3 wherein said flexible skirt has one end portion thereof fixedly attached to said ball retainer cup and has an opposite end portion which abuts the outlet passageway at said second location.

5. A ball-type check valve assembly for use in a fluid flow line comprising a valve body having an inlet end for directing the flow of fluid from the flow line into an inlet passageway, an outlet end for directing the flow of fluid received from an outlet passageway into the fluid flow line, said outlet passageway being adapted to fluidly communicate with said inlet passageway, a ball seat member positioned adjacent the inlet end in the inlet passageway, said ball seat having a passageway extending therethrough to allow fluid received through said inlet end to flow said inlet passageway, a ball retainer cup positioned within said valve body intermediate said inlet end and said outlet end, said ball retainer cup having a passageway extending therethrough providing first means adapted to fluidly communicate said inlet passageway with said outlet passageway, spaced apart lug members attached to said valve body and to said ball retainer cup, said lug members being adapted to support said ball retainer cup intermediate said inlet end and said outlet end, a plurality of channels defined by the space between adjacent ones of said lug members providing second means adapted to fluidly communicate said inlet passageway with said outlet passageway, each of said channels being adapted to direct the flow of fluid from said inlet passageway to a first location within said outlet passageway, a flexible skirt member having one end portion thereof abutting said ball retainer cup and extending therefrom to another end portion located at a second location within said outlet passageway between said first location and said outlet end, said other end portion of the flexible skirt member abutting said outlet passageway at said second location, said flexible skirt member having a passageway extending therethrough which registers with said passageway extending through said ball retainer cup and having an outside diameter adapted to be less than the diameter of said outlet passageway, and a ball valve member adapted to be moved between said ball retainer cup and said ball seat.

6. A ball-type check valve assembly for use in a fluid flow line comprising a valve body having an inlet end for directing the flow of fluid from the flow line into an inlet passageway, an outlet end for directing the flow of fluid received from an outlet passageway into the fluid flow line, said outlet passageway being adapted to fluidly communicate with said inlet passageway, a ball seat member positioned adjacent the inlet end in the inlet passageway, said ball seat having a passageway extending therethrough to allow fluid received through said inlet end to flow through said inlet passageway, a ball retainer cup positioned within said valve body intermediate said inlet end and said outlet end, said ball retainer cup having a passageway extending therethrough providing first means adapted to fluidly communicate said inlet passageway with said outlet passageway, spaced apart lug members attached to said valve body and to said ball retainer cup, said lug members being adapted to support said ball retainer cup intermediate said inlet end and said outlet end, a plurality of channels defined by the space between adjacent ones of said lug members providing second means adapted to fluidly communicate said inlet passageway with said outlet passageway, each of said channels being adapted to direct the flow of fluid from said inlet passageway to a first location within said outlet passageway, a flexible skirt member having one end portion thereof abutting said ball retainer cup and extending therefrom to another end portion located at a second location within said outlet passageway between said first location and said outlet end, said flexible skirt member having a passageway extending therethrough which is in fluid communication with said passageway extending through said ball retainer cup and having an outside diameter sufficiently less than the diameter of said outlet passageway to permit fluid to flow from said channels into and through said outlet passageway, and a ball valve member adapted to be moved between said ball retainer cup and said ball seat.

7. In a ball-type check valve assembly for use in a fluid flow line, the check valve having a valve body including an inlet end for directing the flow of fluid from the flow line into an inlet passageway, an outlet and for directing the flow of fluid received from an outlet passageway into the fluid flow line, a ball seat positioned with the valve body intermediate the inlet end and the outlet end, the ball seat having a passageway extending therethrough providing first means adapted to fluidly communicate the inlet passageway with the outlet passageway, at least one channel providing second means adapted to fluidly communicate the inlet passageway with the outlet passageway, the channel being adapted to direct the flow of fluid from said inlet passageway into the outlet passageway at a first location spaced from the outlet end, and a ball valve member movable between the ball seat and the inlet end, the present improvement comprising a flexible skirt member having one end portion thereof abutting the ball retainer cup and extending therefrom to another end portion located at a second location within the outlet passageway between the first location and the outlet end, said flexible skirt member having a passageway extending therethrough which registers with the passageway, extending through the ball retainer cup and having an outside diameter adapted to permit fluid flowing from the channel to flow into and through said outlet passageway.

* * * * *